United States Patent [19]

Iijima et al.

[11] 4,410,201

[45] Oct. 18, 1983

[54] RIGID AXLE REAR SUSPENSION FOR AN AUTOMOTIVE VEHICLE OR THE LIKE

[75] Inventors: Yoshitaka Iijima, Yokohama; Masanori Abe, Kawasaki, both of Japan

[73] Assignee: Nissan Motor Co., Ltd., Yokohama, Japan

[21] Appl. No.: 265,386

[22] Filed: May 20, 1981

[30] Foreign Application Priority Data

May 30, 1980 [JP] Japan ............................. 55-73785[U]

[51] Int. Cl.³ ............................................... B60G 9/02
[52] U.S. Cl. ................................... 280/688; 280/713; 280/725; 301/125
[58] Field of Search ............... 280/675, 112 R, 112 A, 280/724, 688, 689, 711, 713, 724, 725; 301/124 R, 127, 125

[56] References Cited

U.S. PATENT DOCUMENTS 3,785,672  1/1974  Shakespear ................... 280/112 A

FOREIGN PATENT DOCUMENTS

| 765682 | 6/1953 | Fed. Rep. of Germany . |
| 1948908 | 7/1978 | Fed. Rep. of Germany . |
| 736324 | 9/1955 | United Kingdom . |
| 799555 | 8/1958 | United Kingdom . |
| 825980 | 12/1959 | United Kingdom . |
| 1155591 | 6/1969 | United Kingdom . |
| 1207658 | 10/1970 | United Kingdom . |
| 1217230 | 12/1970 | United Kingdom . |
| 1317182 | 5/1973 | United Kingdom . |
| 1347109 | 2/1974 | United Kingdom . |
| 1435483 | 5/1976 | United Kingdom . |
| 2001917 | 2/1979 | United Kingdom . |
| 1548114 | 7/1979 | United Kingdom . |
| 2048795 | 12/1980 | United Kingdom . |
| 2056382 | 3/1981 | United Kingdom . |

OTHER PUBLICATIONS

P. 82 of the Periodical "MOT", No. 3/1980.

*Primary Examiner*—Robert R. Song
*Attorney, Agent, or Firm*—Schwartz, Jeffery, Schwaab, Mack, Blumenthal & Koch

[57] ABSTRACT

An axle having a shallow "U" shape is oriented beneath the vehicle so that side and bottom sections of the U-shape extend either forward or are angled slightly downward and connected to the chassis through trailing links of different lengths whereby the axle rotates during vertical movement of the road wheels. The axle is disposed in the vehicle so that as the axle moves vertically, the ends of the axle pivot up on either side of a tire housing while the center or inboard portion moves through a smaller distance into a clearance between the tire housing and a fuel tank.

14 Claims, 8 Drawing Figures

RIGID AXLE REAR SUSPENSION FOR AN AUTOMOTIVE VEHICLE OR THE LIKE

BACKGROUND OF THE INVENTION

1. Field of the Invention

The present invention relates generally to a vehicular rear suspension and more specifically to a rigid or live axle suspension for a front engine-front wheel drive or "FF" vehicle.

2. Description of the Prior Art

In a known rear suspension system for an FF type vehicle, such as shown in FIGS. 2 and 3 of the drawings, a rigid straight axle 1 has been connected to a chassis 2 of a vehicle 3 through a plurality of trailing arms or links 4 and 5. However, this arrangement has suffered from the drawback that, when used in vehicles having a short rear overhang (OH), such as shown in FIG. 1, it has been necessary to locate the fuel tank 6 below the rear passenger seat 7, and to locate the tire housing 8 at a relatively high level within the vehicle so as to allow for a full bound of the suspension which would otherwise bring the rigid axle into contact with the tire housing and/or conduiting (such as the exhaust conduit and/or fuel tank filler pipe). The disposition of the tire housing in this relatively high position reduces the space 9 available for luggage storage or the like, hence inducing a vehicle body design problem.

SUMMARY OF THE INVENTION

The present invention features a rigid axle which is curved so as to have a shallow "U" configuration. The bottom of the U-shaped may be oriented either directly forward or angled slightly downward and away from the vehicle. This alone tends to locate the major inboard portion of the axle within a space defined between the tire housing and the fuel tank during a full bound of suspension. However, due to the different lengths of the trailing arms connecting the axle to the vehicle chassis, the axle per se rotates during upward and downward (vertical) movement of the suspension which allows the outboard ends of the axle to move through a distance much greater than that through which the center or inboard portion moves and which allows the outboard end portions to pivot up on either side of a tire housing or the like. This makes it possible to locate the tire housing and the floor of the luggage compartment or the like at a relatively low level within the vehicle while still leaving adequate room between the housing and the center portion of the axle for conduiting such as an exhaust pipe and/or a fuel tank filler pipe.

Further, during a rear end collision of the vehicle, the rotatable nature of the axle allows the inboard portion to be rotated about the end portions back toward the rear of the vehicle. This in part compensates for the overall forward movement of the axle toward the fuel tank so that the inboard or center portion of the axle moves through the minimum distance toward said fuel tank.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
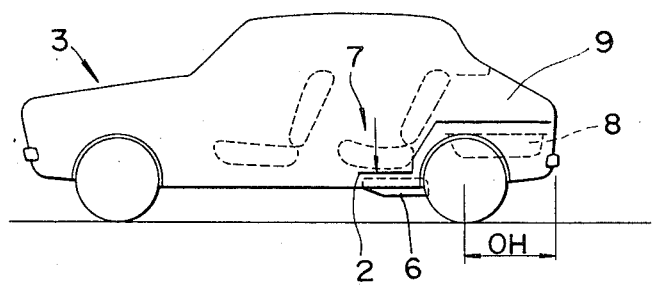
FIG. 1 is a schematic elevation of a front wheel drive vehicle having a short rear overhang.
Figure 2:
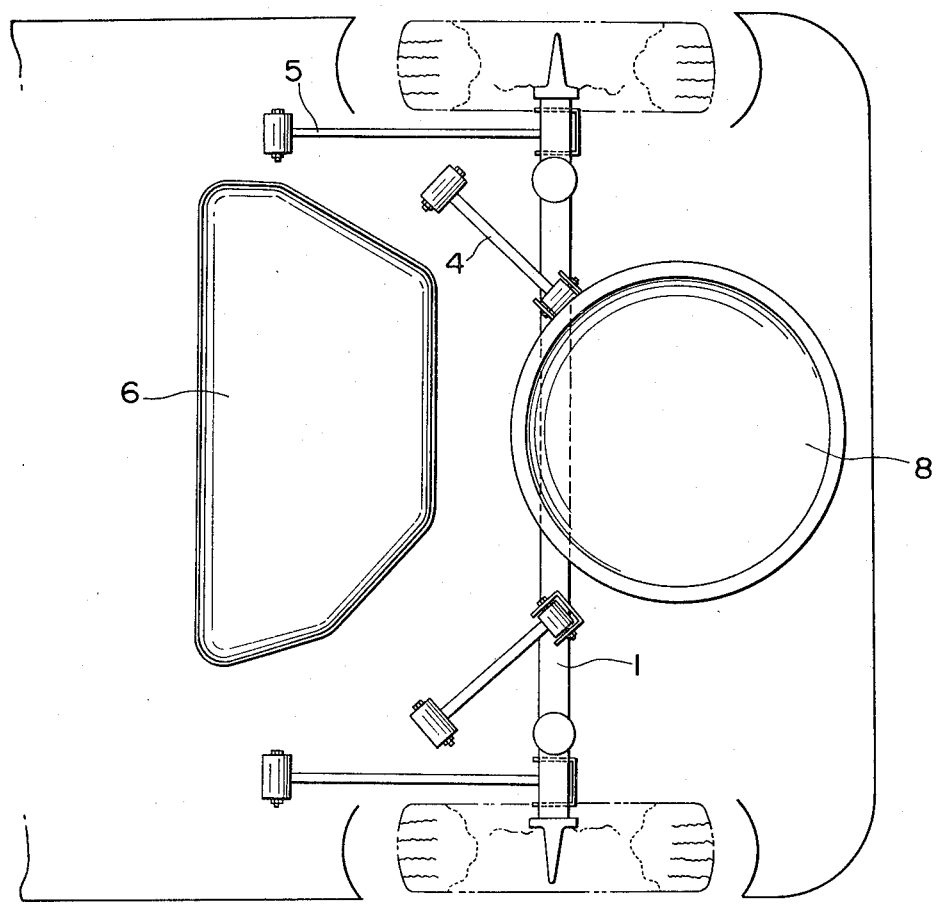
FIG. 2 is a plan view of a suspension briefly discussed previously under the heading of "Description of the Prior Art"
Figure 3:
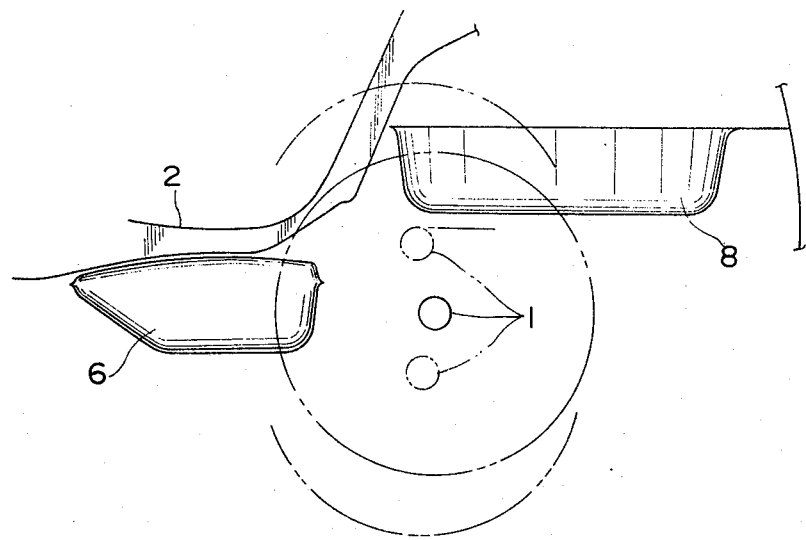
FIG. 3 is a schemmatic elevational view of the arrangement shown in FIG. 2.
Figure 5:
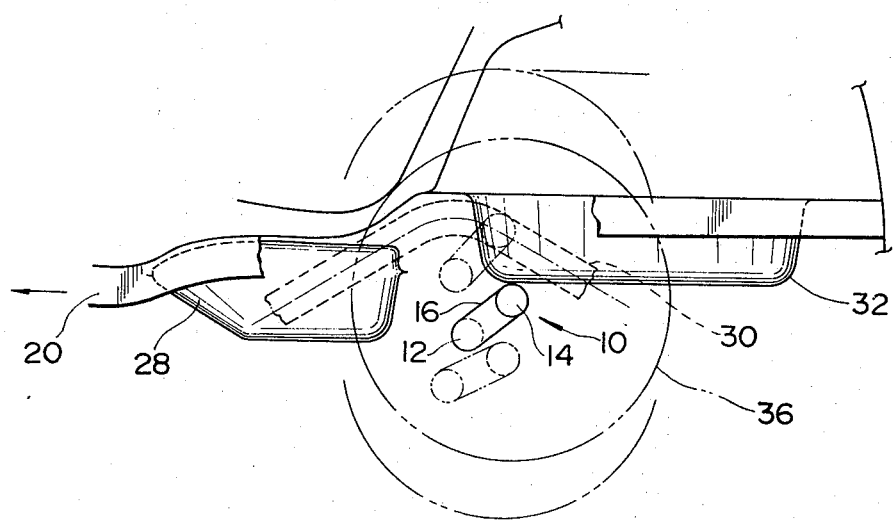
FIG. 5 is a schemmatic elevational view of the arrangement shown in FIG. 4.
Figure 4:
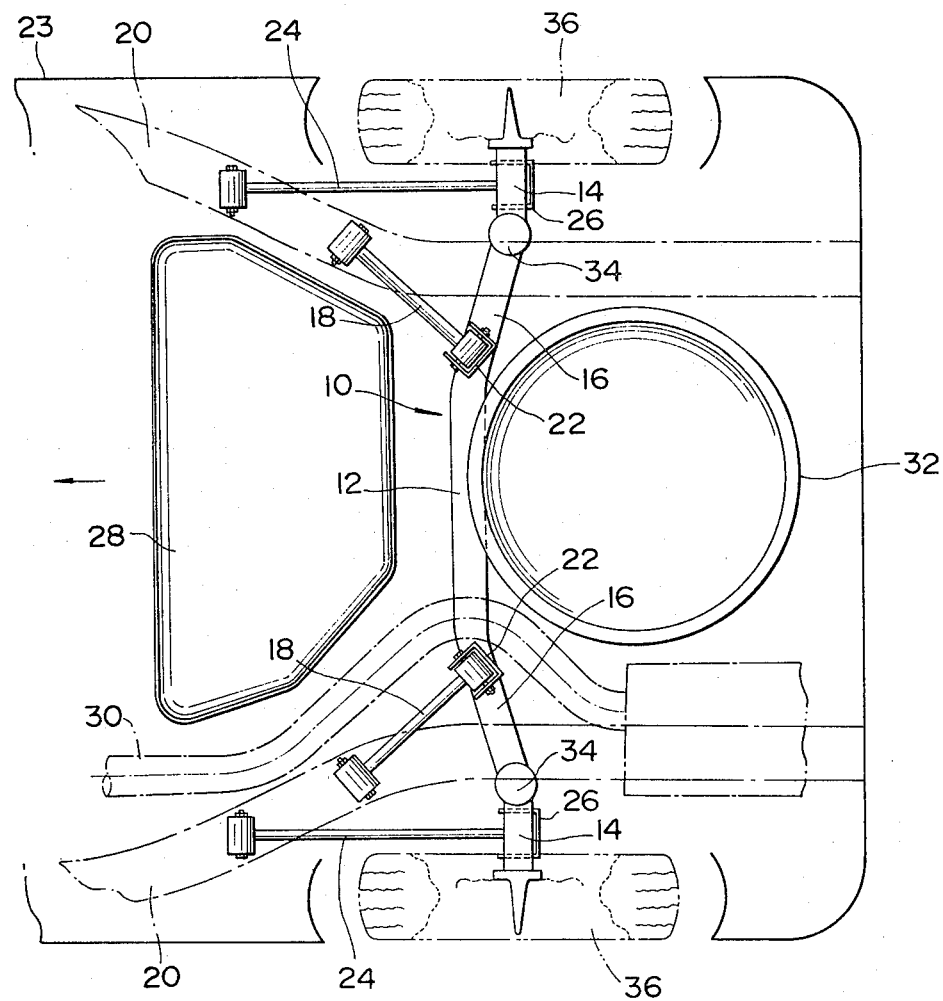
FIG. 4 is a plan view of a first embodiment of the present invention.

Turning now to the drawings and more particularly to FIGS. 4 and 5, a first embodiment of the invention is shown. As best appreciated from FIG. 4, the live or rigid axle 10 is curved to have an essentially shallow "U" shape. The inboard portion 12 is essentially straight and is connected to end portions 14 through intermediate sections 16. Each link of a first pair of trailing links 18 is pivotally connected to the chassis 20 at one end thereof and to the axle 10 at the other end thereof by means of a bracket 22 welded or otherwise fixedly connected to the axle. The brackets 22 are arranged at or close to the ends of the straight inboard portion 12. The first pair of links 18, as shown in FIG. 4 is disposed at a predetermined angle with respect to the longitudinal direction of the vehicle body 23. Each link of a second pair of trailing links 24 is pivotally connected at one end thereof to the chasssis 20 but at a point forward of the connection point of the trailing link 18. The other ends of links 24 are connected to the end portions of the axle through suitable brackets 26.

Disposed ahead of the axle 10 is a fuel tank 28. This tank, as shown, is disposed slightly off center within the vehicle and slightly irregularly shaped so as to allow for the provision of conduiting 30 such as the exhaust and muffler (and/or catalytic converter) (shown in phantom) to one side thereof. Disposed to the rear of and slightly above the axle is a tire housing 32.

With this arrangement, during normal operation such as is shown in FIG. 5, the axle 10 tends to rotate due to the difference in length of the two pairs of trailing links 18, 24. The normal position of the axle is shown in solid line while the full bound position and the lowermost position of the axle are shown in phantom. As will be appreciated from this figure, the end portions 14 of the axle move through a distance greater than that of the center or inboard portion portion 12. Further, the exhaust pipe or the like 30 is not apt to be crushed by the axle 10 during a full bound, there being provided an adequate clearance between the center portion of the axle and the pipe. Moreover, the center or inboard portion 12 tends to move into the clearance defined between the left end of the fuel tank 28 and the forward end of the tire housing 32, which allows the tire housing per se to be located lower within the vehicle increasing the space available for luggage or the like thereabove.

Mounting sites 34 are provided on the axle 10 immediately inboard of the brackets 26. The function of the mounting sites is to support suitable coil springs, leaf springs, hydraulic (air/oil) suspension struts and/or shock absorbers (not shown).

Figure 6:
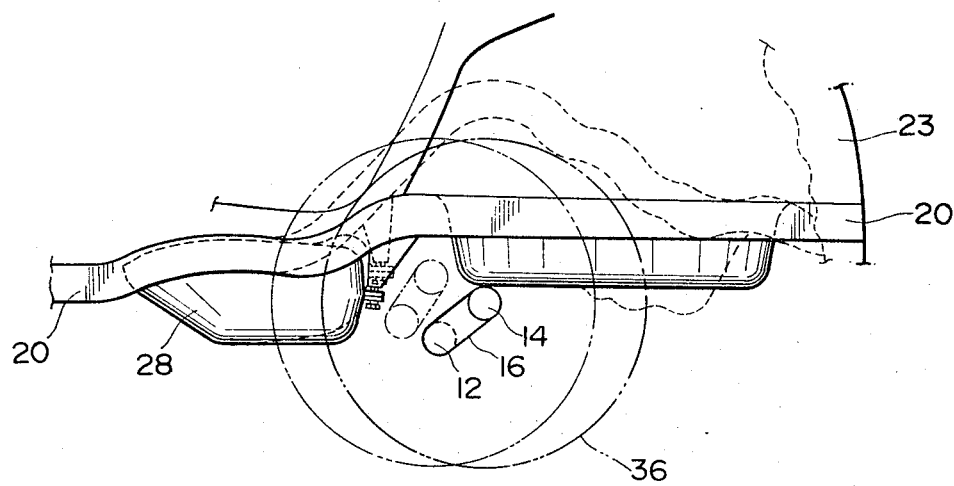
FIG. 6 is an schemmatic elevational view showing the movement of the rear suspension due to a rear end collision.

FIG. 6 shows in phantom the possible deformation of the vehcle body 23 and chassis 20 as a result of a rear end collision. Under the illustrated circumstances, the axle 10 as a whole is moved forward due to the impact. However, because the axle is rotatable, an impact severe enough to drive the rear wheels 36 forward as illustrated will cause the axle to rotate to the position as shown. The reason for this is most of the force moving the wheels forward will be transmitted to the chassis through the longer trailing links 24 rather than through the shorter trailing links 18, the latter being connected to a section of the axle which is more yielding under these conditions and accordingly subject to a lesser force. That is, the center or inboard portion of the axle is more yieldable because it may be rotated about the end portions 14 back toward the rear of the vehicle. This rearward rotation of the inboard portion of the axle serves to prevent an undesired and possibly disasterous impact between the inboard portion of the axle and the fuel tank.

Figure 7:
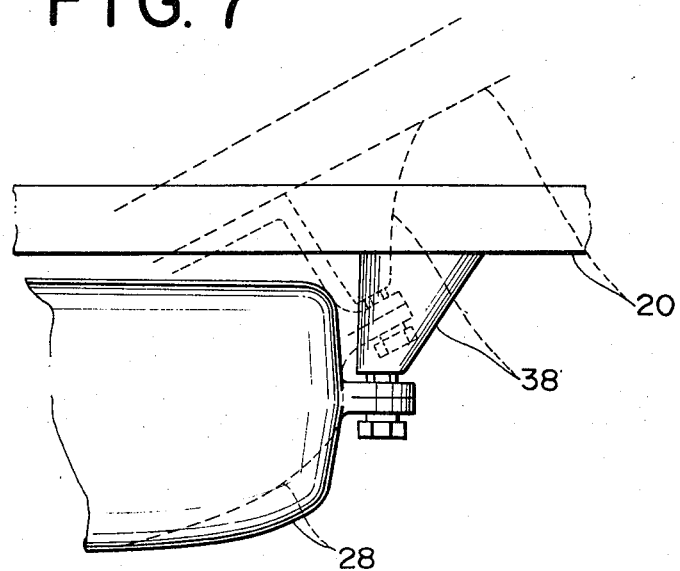
FIG. 7 is a sketch showing the deformation of the vehicle fuel tank which may accompany the movement of the suspension during a rear end collision in a manner which reduces the possibility of the rear suspension axle's colliding with the fuel tank.

FIG. 7 shows an arrangement which can be provided and which cooperates with the rearward rotation of the axle, to assist in preventing an axle-fuel tank collision. In this arrangement the aft end of the fuel tank is supported by a bracket or brackets 38 which are connected to the chassis 20 in such a manner as to pull the fuel tank 28 upwardly and away from the axle 10 during a rear end impact. This arrangement is also illustrated in FIG. 6 in phantom wherein it is shown that an additional clearance is provided via the upward deformation of the fuel tank.

Figure 8:
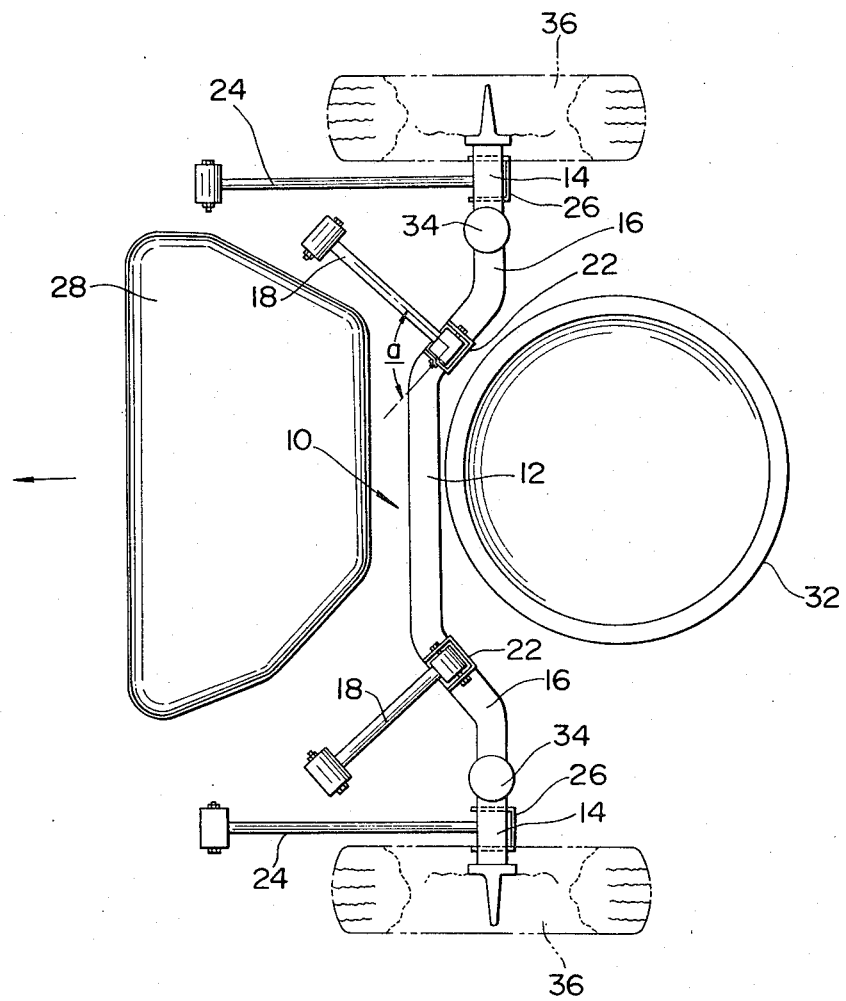
FIG. 8 is a plan view of a second embodiment of the present invention.

FIG. 8 shows a second embodiment of the present invention. In this embodiment, the angle of the intermediate sections 16 is such that the mounting brackets 22 may be mounted on the axle so that the angle "a" defined between the intermediate sections and the trailing links 18 may be as great as 90 degrees. This arrangement facilitates the connection of the brackets 22 to the axle proper.

In both of the foregoing disclosed embodiments it is possible for the axle to be arranged so that the intermediate sections 16 thereof extend directly forward rather than being slightly angled downwardly as shown in FIG. 5.

Thus, in summary, the present invention provides a rigid axle for the rear suspension of a vehicle which simultaneously increases the clearance available for conduiting, such as an exhaust pipe or fuel tank filler pipe, which allows the tire housing to be located in a relatively low position within the vehicle, and which reduces the possibility of an axle-fuel tank impact as a result of a rear end collision of the vehicle. All of this is achieved by curving the rear axle and mounting same so that it rotates upon vertical movement thereof.

The invention is simple, easy to manufacture and assemble which adds to the ingenuity of the arrangement.

What is claimed is:

1. In a vehicle having a chassis, a rear axle suspension assembly comprising:
    an axle having two transversely extending axially aligned end portions for rotatably supporting the road wheels of the vehicle, said axle having a forwardly offset transversely extending central inboard portion, and said axle having two intermediate portions angled with respect to and connecting said two end portions to said inboard portion;
    a first pair of links pivotally mounted to the chassis at their forward ends and connected to said two intermediate portions of said axle at their rearward ends; and
    a second pair of links pivotally mounted to the chassis at their forward ends and connected to said two end portions of said axle at their rearward ends;
    said first and said second pairs of links pivotally swinging said axle about the chassis pivot mounts and rotating said axle in response to substantially vertical movement of the road wheels.

2. Apparatus of claim 1 wherein said second pair of links extend rearwardly from the chassis in a substantially parallel relationship, and said first pair of links are positioned between said second pair of links and extend rearwardly from the chassis in a rearwardly converging relationship.

3. Apparatus of claim 2 wherein each of said second pair of links is longer than each of said first pair of links.

4. Apparatus of claim 3 wherein said first pair of links is unbiased.

5. Apparatus of claim 4 wherein each of said first pair of links is connected to said intermediate portion of said axle in a substantially perpendicular relationship.

6. Apparatus of claim 4 wherein said first pair of links rearwardly converge approximately perpendicularly.

7. Apparatus of claim 4 wherein movement of said first and second pairs of links moves said inboard portion of said axle into the space between the fuel tank and the tire housing.

8. In a vehicle having a chassis, a rear axle suspension assembly comprising:
    an axle having two straight axially aligned transversely extending end portions for rotatably supporting the road wheels of the vehicle, said axle having a straight forwardly offset transversely extending central inboard portion, and said axle having two intermediate portions angled with respect to and connecting said two end portions to said inboard portion;
    a first pair of unbiased links pivotally mounted to the chassis at their forward ends and connected to said two intermediate portions of said axle at their rearward ends; and
    a second pair of links pivotally mounted to the chassis at their forward ends and connected to said end portions of said axle at their rearward ends;
    each of said second pair of links beig longer than each of said first pair of links, said second pair of links extending rearwardly from the chassis in a substantially parallel relationship, said first pair of links being positioned between said second pair of links and extending rearwardly from the chassis in a rearwardly converging relationship;
    said first and second pairs of links pivotally swinging about the chassis pivot mounts and rotating said axle in response to substantially vertical movement of the road wheels.

9. In a vehicle:
    a chassis;
    a first container fixed to the lower surface of said chassis;

a second container fixed to the lower surface of said chassis aft of said first container so as to define a space between it and said first container;

an axle having an essentially straight inboard section and curved sections leading from each end of said straight inboard section to end portions adapted to rotatably support road wheels;

a first set of links interconnecting said curved sections of said axle to said chassis;

a second set of links interconnecting said end portions with said chassis, said second set of links being connected to said chassis at a level forward of that at which said first set of links are connected;

biasing means interconnecting said end portions and said chassis for exclusively applying a bias to said axle;

said first and second sets of links being arranged such that upon said biasing means being compressed said inboard portion moves upwardly into said space.

10. In a vehicle having a chassis, the combination of:
an axle having an inboard portion and curved sections leading from each end of said inboard portion to end portions adapted to rotatably support road wheels of the vehicle;

a first set of unbiased links which exclusively interconnect said curved sections of said axle to the chassis of the vehicle; and a second set of links interconnecting said end portions of said axle to said chassis, said first and second sets of links being adapted to rotate said axle upon vertical movement of the axle.

11. A combination as claimed in claim 10, further comprising:
a housing fixed to said chassis and located so that, upon said axle moving vertically, the end portions of said axle assume positions on each side of said housing while said inboard portion assumes a position forward of said housing.

12. A combination as claimed in claim 11, further comprising a container fixed to said chassis forward of said housing and defining a clearance therebetween, said inboard portion of said axle being movable into said clearance during vertical movement of said axle.

13. A combination as claimed in claim 10, wherein said first and second set of links are of different lengths and said first set of links is adapted to pivotally connect with said axle at said curved sections near the ends of said inboard portion.

14. A combination as claimed in claim 13, wherein each of said first set of links define a predetermined angle with respect to said curved section, said angle being as great as 90 degrees.

* * * * *